United States Patent Office 3,109,820
Patented Nov. 5, 1963

3,109,820
ULTRAVIOLET EMITTING PHOSPHOR
COMPOSITIONS
Richard C. Ropp, Towanda, Pa., assignor to Sylvania
Electric Products Inc., a corporation of Delaware
Filed Dec. 28, 1961, Ser. No. 162,860
6 Claims. (Cl. 252—301.6)

This invention relates to phosphors which may be used in fluorescent lamps and particularly to materials which may be excited by short wave ultraviolet radiation to emit longer wave ultraviolet light. Specifically, this invention concerns new pyrosilicate phosphor compositions which may be activated by lead to give a high intensity ultraviolet emission.

It has been known previously that certain silicates may be activated by lead to yield phosphors having emissions lying in the long wave ultraviolet spectrum and having excellent response to short wave ultraviolet excitation. Examples of such, lead-activated silicates are those similar in composition to the naturally occurring Akermanites and Hardystonites and having the general formula of $M_2MgSi_2O_7$:Pb and $M_2ZnSi_2O_7$:Pb respectively, wherein M may be Ba, Sr or Ca.

According to my invention, I have found that certain lead-activated pyrosilicates based upon cadmium are phosphors of new compositions having emission bands in regions not found in the lead-activated pyrosilicates of the prior art. I have generally designated the phosphors by formula $M_2CdSi_2O_7$:Pb where M may be Ba, Sr and/or Ca. My phosphors are particularly useful in low pressure mercury vapor lamps and they produce a high emission intensity at 4000 A., a region of significant practical importance in photocopy applications.

Accordingly, the primary object of this invention is the production of novel ultraviolet-emitting phosphors having good response to excitation at 2537 A.

A feature of my invention is the preparation of a cadmium-based pyrosilicate phosphor activated by lead and containing at least one alkaline earth metal.

An advantage of this invention is that my phosphors have peak emissions lying in regions of significant practical importance for photocopy applications.

Figure 1:
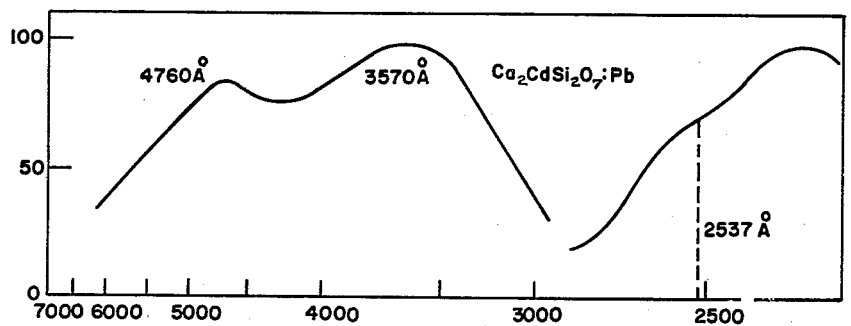
Figure 2:
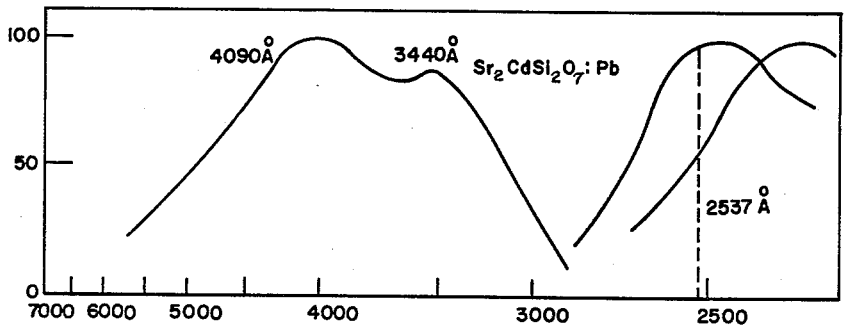
Figure 3:
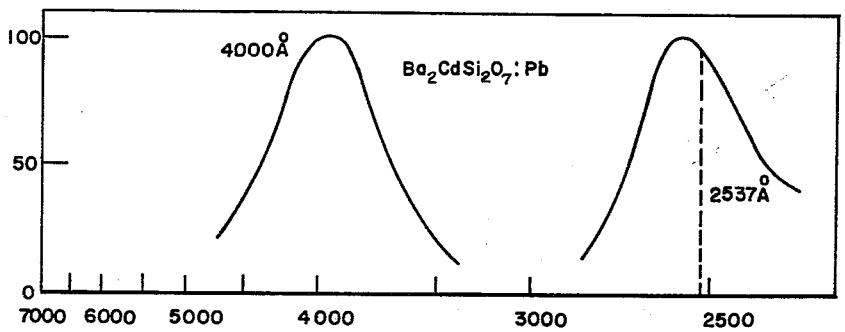
Figure 4:
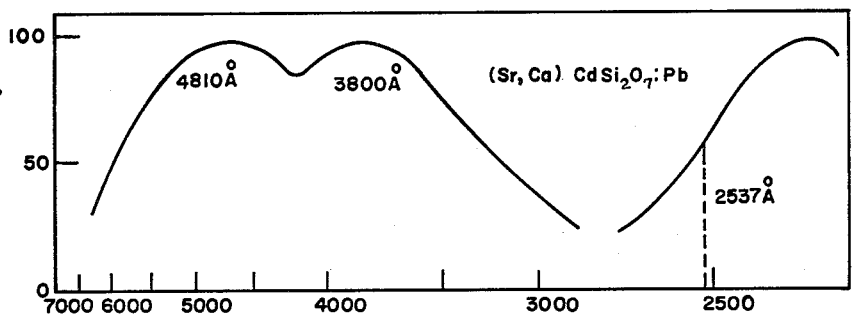
Figure 5:
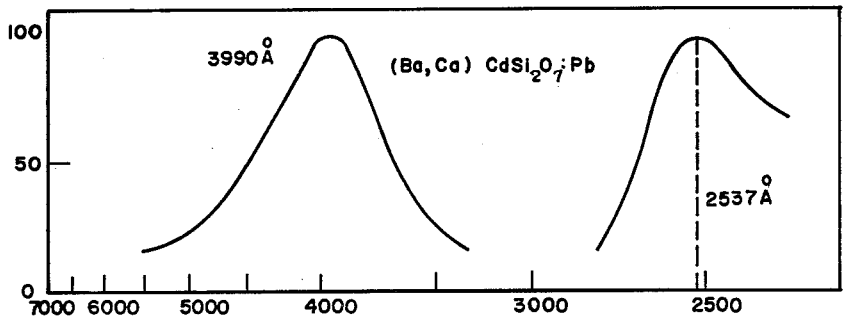
Figure 6:
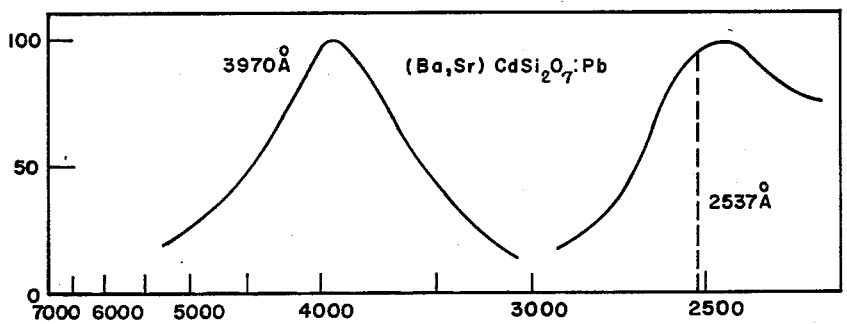

The many other objects, features and advantages of my invention will become manifest to those versed in the art upon reading the following specification when taken in conjunction with the accompanying drawings. Of these drawings:

FIGURES 1 to 3 are curves illustrating excitation-emission properties of the single phases of the alkaline earth, cadmium pyrosilicates activated by lead and FIGURES 4 to 6 are curves illustrating the excitation-emission properties of more complex alkaline earth, cadmium pyrosilicate phosphors. In each of FIGURES 1 to 6 the ordinate is expressed in percent emission as relative to the peak emission intensity and the abscissa in angstrom units.

In the preparation of my phosphors, I have found that it is desirable to mix the oxides, or compounds which decompose upon heating to form the oxides, such as the nitrates or carbonates with similar cadmium and silicon compounds. For the activator, many compounds of lead are acceptable so long as they will easily assimilate into the crystal lattice of the matrix. Although there are many possibilities of compounds which may be used in my phosphor formulation, as indicated above, I prefer to prepare the phosphor from barium nitrate, strontium carbonate and/or calcium carbonate together with cadmium oxide, silicic acid, and lead oxide.

It is well known and conventional to add halide fluxes to the phosphor starting material mixture. If a flux is desired, use may be made of the fluoride and chlorides of the alkaline earth metals, lead or ammonia. The incorporation of flux materials reduces the temperature required to form the luminescent silicates of my invention, acts to promote crystallization and may minimize the firing time. The amount of flux which should be added is known to the art but preferably, the amount of halide in moles should not exceed 1/10 of the mole total of all the cations, excluding the activators.

When preparing the starting material mixture, the formulation is not particularly critical and some deviations may be made from the theoretical formula so long as a crystal structure reasonably approximating the tetragonal is obtained after firing, because without this structure, the material will not exhibit appreciable luminescence. For example, in my new phosphors

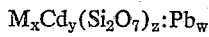

$$M_xCd_y(Si_2O_7)_z:Pb_w$$

where M is at least one member selected from the group consisting of calcium, barium and strontium, $x$ may vary from about 1.3 to 2.5, $y$ from about 0.5 to 1.5, $z$ from about 0.5 to 1.5 and $w$ from about 0.005 to 0.08. (All of these quantities have been recited in mols.)

After mixing the starting materials together, they are placed in a covered crucible and fired in an oven for 1 to 3 hours at 500 to 1000° C. The dry powder is intermixed again and flux is added. When the mixing is completed, the mixture is replaced in the covered crucible and refired at temperatures of 900 to 1300° C. for 2 to 6 hours. Upon subsequent incorporation into a fluorescent lamp according to conventional techniques, the phosphors produced exhibit ultraviolet luminescence when stimulated by energy at 2537 A.

A requirement has been placed upon many phosphors that they should be excited to peak or near peak emission at 2537 A. because this is the energy level produced by mercury ions in a fluorescent lamp. My phosphors readily fulfill this requirement as will be seen in the accompanying drawings.

In FIGURES 1 to 3, the emission and excitation for each of the alkaline earth cadmium based pyrosilicates encompassed within my invention are shown. The curves on the right hand side of the figures are illustrative of the emission peaks and it will be seen that each compound is excited to near peak emission by irradiation at 2537 A. On the spectral energy distribution curve illustrated on the left hand of the figures, it will be seen that upon irradiation of energy at 2537 A., a broad ultraviolet emission is produced in the case of calcium and strontium substituted pyrosilicates, while the curve sharply peaks with the barium substituted pyrosilicates. Depending upon the intended use of the phosphor, it is easy to select the requisite ultraviolet emission desired.

Turning now to FIGURES 4 to 6, it becomes apparent from the curves on the left hand side, that mixed alkaline earth, cadmium based pyrosilicates are quite responsive to ultraviolet excitation at 2537 A. Here also, the barium based mixed pyrosilicates peak sharply upon irradiation 2537 A. and give excellent response. Phosphors containing mixtures of calcium and strontium alone have broad band emission which may be desirable for other applications.

The crystal structure of the phosphors according to my invention is tetragonal with the exception of

$$Ca_2CdSi_2O_7:Pb$$

In Table I it is seen that the cadmium based phosphors containing barium (Examples 1, 2 and 3) are tetragonal, while in contrast, the zinc and magnesium based phosphors containing barium are neither tetragonal nor do they possess high efficiencies. Thus, I believe that the crystal structure must be tetragonal if efficient phosphors are to be produced.

TABLE I

| Phosphor | Crystal System | D Values (A) | | | | |
|---|---|---|---|---|---|---|
| | | $a_0$ | $c_0$ | (1) | (2) | (3) |
| 1. $Ba_2CdSi_2O_7$:Pb | Tetr | 8.45 | 5.36 | 3.09 | 3.31 | 3.99 |
| 2. (Ba, Sr)$CdSi_2O_7$:Pb | Tetr | 8.37 | 5.26 | 3.05 | 3.27 | 3.93 |
| 3. (Ba, Ca)$CdSi_2O_7$:Pb | Tetr | 8.40 | 5.36 | 3.08 | 3.31 | 2.67 |
| 4. $Ca_2CdSi_2O_7$:Pb | (1) | (1) | (1) | (1) | (1) | (1) |
| 5. $Sr_2CdSi_2O_7$:Pb | Tetr | 8.25 | 5.17 | 3.00 | 3.22 | 3.87 |
| 6. (Sr, Ba)$MgSi_2O_7$:Pb | Tetr | 8.10 | 5.27 | 2.98 | 3.21 | 5.72 |
| 7. (Sr, Ba)$ZnSi_2O_7$:Pb | Tetr | 8.91 | 4.52 | 2.98 | 2.98 | 3.14 |
| 8. $Ba_2ZnSi_2O_7$:Pb | (2) | (2) | (2) | 3.17 | 2.92 | 2.91 |
| 9. $Ba_2MgSi_2O_7$:Pb | (2) | (2) | (2) | 3.17 | 3.04 | 2.91 |

[1] Undetermined.
[2] Not tetragonal.

The phosphors produced according to my invention are very suitable for use in combination with low pressure, mercury vapor discharge tubes since the discharge of such tubes emits a high amount of radiation of wave length of 2537 A., which thus can be converted, with satisfactory efficiency into a radiation having a maximum emission between 2800 A. and 5500 A. Such a substance may be coated as a layer on the inner wall of the envelope of these discharge tubes. However, the substance may be alternatively arranged outside the discharge tube, for example on a reflector, in which case the exciting radiation must pass through the envelope of the discharge tube and in this case the envelope should be made of quartz to allow such passage.

While we have disclosed a broad class of compounds, I have found that the phosphors containing barium are of great practical interest for photocopy applications because of the relatively sharp peak emission. The theoretical formula for these phosphors would be $$(BaM)CdSi_2O_7:Pb$$

where M can be Sr, Ca or no addition. The mole ratio of components in such barium containing phosphor conform to the above recited mole ratios in the broad class of phosphors disclosed.

The following specific examples of the invention are given as a further explanation.

*Example I*

Mix together thoroughly 473.1 gm. of $Ba(NO_3)_2$, 17.5 gm. $BaF_2$, 146.5 gm. $CdO_2$, 136.6 gm. $SiO_2$:$xH_2O$, and 3.4 gm. PbO. Prefire the ingredients in air for 4 hrs. at 1600° F. in a covered silica crucible. At the end of the firing time, remove the crucible from the hot furnace and allow to cool. Crush the phosphor, add 6% $BaCl_2$ by weight of prefired phosphor, mix and refire for 4 hrs. at 1800° F. in an ambient steam atmosphere. The resulting phosphor will emit at 4000 A. under 2537 A. excitation.

*Example II*

Mix together 267.2 gm. $SrCO_3$, 12.6 gm. $SrF_2$, 146.5 gm. $CdO_2$, 136.6 gm. $SiO_2$:$xH_2O$, and 3.4 gm. PbO. Prefire as before. The resulting phosphor will emit in a broader emission band (peaks at 4090 A. and 3440 A.) than the preceding example, but at a lower intensity.

*Example III*

Mix together 224.8 gm. $Ba(NO_3)_2$, 140.3 gm. $SrCO_3$, 17.5 gm. of $BaF_2$, 146.5 gm. $CdO_2$, 136.6 gm. $SiO_2$:$xH_2O$, and 3.4 gm. PbO. Process as before. The resulting phosphor emits at 3970 A.

*Example IV*

Mix together as described previously 224.8 gm. $Ba(NO_3)_2$, 95.1 gm. $CaCO_3$, 17.5 gm. $BaF_2$, 146.5 gm. $CdO_2$, 136.6 gm. $SiO_2$:$xH_2O$, and 3.4 gm. PbO. Process as described in Example I. The resulting phosphor emits at 3990 A.

As my invention I claim:

1. A luminescent material consisting essentially of a cadmium pyrosilicate phosphor activated by lead and containing at least one alkaline earth metal selected from the group consisting of calcium, barium and strontium wherein the lead content is between about 0.005 to 0.08.

2. $M_xCd_y(Si_2O_7)_z$:$Pb_w$ where M is at least one member selected from the group consisting of Ca, Ba and Sr and $x$ is between about 1.3 to 2.5, $y$ is between about 0.5 to 1.5, $z$ is between about 0.5 to 1.5 and $w$ is between about 0.005 to 0.08.

3. A luminescent material consisting essentially of a cadmium pyrosilicate phosphor having alkaline earth metal atoms substituted for the cadmium atoms and excited to luminescence by a lead activator wherein the cadmium is present in the phosphor in molar quantities between about 0.5 to 1.5, alkaline earth metals between about 1.3 to 2.5 and pyrosilicate between about 0.5 to 1.5.

4. The phosphor according to claim 3 wherein the material has a tetragonal crystal structure.

5. $Ba_aCa_bSr_cCdSi_2O_7$:Pb wherein of the Ba, Ca and Sr, at least the Ba is present and the total of $a+b+c$ equals 2.

6. $Ba_aCa_bSr_cCd_y(Si_2O_7)_z$:$Pb_w$ wherein of the Ba, Ca and Sr, at least the Ba is present and the total of $a+b+c$ equals between about 1.3 to 2.5, $y$ is between about 0.5 to 1.5, $z$ is between about 0.5 to 1.5 and $w$ is between about 0.005 and 0.08.

References Cited in the file of this patent

UNITED STATES PATENTS

| 2,471,082 | Schulman | May 29, 1949 |
| 2,846,403 | Hoekstra et al. | Aug. 5, 1958 |
| 2,965,579 | Cox et al. | Dec. 20, 1960 |

OTHER REFERENCES

Dement: Fluorochemistry, Chemical Pub. Co. Inc., Brooklyn, New York, 1945, page 454.